United States Patent [19]

Freeman

[11] 4,337,375

[45] Jun. 29, 1982

[54] MANUALLY CONTROLLABLE DATA READING APPARATUS FOR SPEECH SYNTHESIZERS

[75] Inventor: Alfred B. Freeman, Emporia, Kans.

[73] Assignee: Texas Instruments Incorporated, Dallas, Tex.

[21] Appl. No.: 158,801

[22] Filed: Jun. 12, 1980

[51] Int. Cl.³ ............................................. G10L 1/00
[52] U.S. Cl. .............................. 179/1 SA; 179/1 SF; 179/1 SM; 235/462; 235/472
[58] Field of Search ............. 179/1 SA, 1 SF, 1 SM; 434/313; 235/462, 472; 364/718

[56] References Cited

U.S. PATENT DOCUMENTS

| | | | |
|---|---|---|---|
| 2,548,011 | 3/1949 | Frost | 35/35 |
| 2,771,509 | 11/1956 | Dudley | 179/1 SM |
| 2,997,306 | 8/1961 | Hicks | 274/42 |
| 3,158,685 | 11/1964 | Gerstmann et al. | 179/1 |
| 3,416,241 | 12/1968 | Weitzner | 434/313 |
| 3,511,932 | 5/1970 | Flanagan | 179/1 |
| 3,575,555 | 4/1971 | Schanne | 179/1 |
| 3,641,496 | 2/1972 | Slavin | 340/148 |
| 3,704,345 | 11/1972 | Coker et al. | 179/1 SA |
| 3,918,029 | 11/1975 | Lemelson | 340/146.3 SY |
| 3,970,803 | 7/1976 | Kinzie, Jr. et al. | 179/100.3 B |
| 3,991,299 | 11/1976 | Chadima | 235/472 |
| 4,060,848 | 11/1977 | Hyatt | 364/200 |
| 4,075,424 | 2/1978 | Underwood et al. | 179/1 SG |
| 4,092,495 | 5/1978 | Underwood et al. | 179/1 SM |
| 4,128,737 | 12/1978 | Dorais | 179/1 SM |
| 4,146,782 | 3/1979 | Barnich | 235/472 |
| 4,160,156 | 7/1979 | Sherer | 235/472 |
| 4,214,125 | 7/1980 | Mozer et al. | 179/1 SM |

FOREIGN PATENT DOCUMENTS

52-40903  3/1977  Japan ............................... 179/1 SM

OTHER PUBLICATIONS

"Linear Prediction: A Tutorial Review", J. Makhoul, Proc. IEEE, vol. 63, pp. 561–580, Apr. 1975.
"Letter Reading Machine", V. K. Zworykin, L. E. Flory, and W. S. Pike, Electronics, Jun. 1949, pp. 80–86.

*Primary Examiner*—Harold I. Pitts
*Attorney, Agent, or Firm*—Leo N. Heiting; Mark E. Ogram; Melvin Sharp

[57] ABSTRACT

The present invention uses a speech synthesizer apparatus to produce sounds in response to code input received from a code record pick-up manually moved over a selected strip on a code record sheet or panel. The code record sheet or panel has visual symbols, such as printed material or pictures, identifying the sound produced from each strip. One embodiment uses a speech synthesizer having a microcomputer which responds directly to the record pick-up output. Other embodiments include separate encoding and buffer storage apparatus interposed between the record pick-up output and the speech synthesizer. One embodiment uses bar code read pens and optical bar code records printed on paper pages or sheets along with the message text, other embodiments use strips with bumps or gitches or both and bump or gitch sensing pick-ups, such as phonograph pick-ups.

36 Claims, 8 Drawing Figures

MANUALLY CONTROLLABLE DATA READING APPARATUS FOR SPEECH SYNTHESIZERS

TECHNICAL FIELD

This invention relates to a manually controllable apparatus for inputting control information to a speech synthesizer.

BACKGROUND OF THE INVENTION

Electronic speech synthesizers have recently become available which are both low enough in cost and small enough in size for many applications. The uses of these speech synthesizers have included entertainment, educational and communication applications.

Different means have been used to input the information to control the speech synthesizer. However, these devices have lacked the capability to selectively and directly control information that will be inputted to the speech synthesizer. Some of the prior art devices are really no more than phonographs, with the control information being imprinted on a record-type device already encoded with audibletype control information. These devices not only fail to incorporate use of a speech synthesizer but also fail to provide a means to directly and selectively control the control information on an incremental level by a user. Other devices, such as conventional record players and tape recorders have failed for much the same reasons. Still other devices have required a person who, in addition to being intimately familiar with the phonetic structure of a language, is able to operate a phonetic keyboard at the rate of about 120 word per minute in order to produce speech at a normal speaking rate.

In the entertainment and educational area, a device manufactured by Texas Instruments known as the SPEAK & SPELL TM learning aid produces canned speeches in response to keyboard manipulations and in accordance with various computer controlled games or exercises. Such a device lacks the facility to input control data at a high enough speed such that the synthesizer will output audible speech information at a normal speech rate. Also, the speech information so produced is of a canned variety. Another commercial product in the entertainment and educational area is a toy for children in which a phonographic-type record accompanies each page of a book and is imprinted on the page itself. A record player-type device is overlayed on top of the page and in this way operates much like a conventional record player, although the record remains stationary and the record player pickup device moves and is overlayed on top of the record instead of the record being overlayed on top of the record player. However, with this device, although a person can associate pictures on the page with a text, there is no direct association between the sounds produced and the text segments, since the information on the record can be accessed only in its entirety, and cannot be selectively accessed in smaller segments. In this way, it is similar to a phonograph record in that it does not lend the user the capability to selectively access smaller segments of the particular material.

In the communication area, language translating computers have recently become available on the market. Such devices provide a keyboard having one key for each letter of the alphabet. A user types in, letter by letter, a word of one language and an electronic display will display the word and its foreign equivalent in text form. Speech synthesizers have recently been combined with such devices to provide an audible rendition of the foreign language equivalent. Clearly however, a rate of communication still depends on the typing rate of the operator, which is very limited since the information must be inputted letter by letter.

Thus, the prior art devices have failed to provide apparatus for controlling speech synthesizers so that data can be put in on an incremental basis with a manual apparatus controlled by the user, but which still provides the capacity for information to be inputted to the speech synthesizer at a high enough rate of speed so that the speech so produced is at a normal speech rate of about 120 words a minute.

There is a need for a device which could provide selective manual control of input data to a speech synthesizer which is capable of inputting data both at phonemic increments and at a mormal speed rate. This would facilitate the learning of written and spoken native languages by children and foreign languages by people of all ages.

SUMMARY OF THE INVENTION

In accordance with the present invention, a manually controllable data reading apparatus is provided so that one can manually and selectively control input data to a speech synthesizer at an incremental level while also having the facility to input data at a high enough rate of speed so that a normal speech rate of about 120 words a minute is possible. The apparatus comprises display material which has coded data imposed thereon. The display material also has visual data imposed thereon being associated with and identifying said coded data. Thus a user can look at the visual data to identify what coded data he desires to be inputted into the speech synthesizer. Manually operable pick-up means are provided whereby a user can manually scan the coded data on the display material. The pick-up means senses the coded data in response to manual movement over the coded data and produces a pick-up output signal representative of the coded data. Conversion means are provided for producing a binary coded output signal representative of and in response to the pick-up output signal. Output means are also provided for providing the binary coded output signal from the conversion means to a speech synthesizer to control the speech output of the speech synthesizer. In this way, a user can selectively control the control data to the speech synthesizer by inputting the information in small segments and can identify those segments by the visual data on the display material. Also, the coded data can be inputted into the speech synthesizer at a rate of speech so that the synthesizer can output the speech at the rate of about 120 words a minute.

In this way, the present invention provides an apparatus for the production of speech sounds and speech in direct association with text or other visual symbols for education, entertainment, and communication. Pre-school children can use the apparatus to read books audibly by manipulating a record pick-up to input information they want to have produced by the synthesizer after they have identified the information by viewing the associated visual data. To add to the entertainment, animal sounds or noises can be produced from the display material if the encoded data contains such information. Similar apparatus can provide pronouncing dictionaries in virtually any language, or can provide foreign language training material with association between text and proper pronunciation.

The invention apparatus further provides for a language translation and communication between persons not sharing a common language. The speech coded data and the associated text identifying the encoded data can be in different languages from each other so that one can find what he or she wants to say printed in his or her language and produce the speech equivalent of the message in a different language. Each person using the device only needs to be able to read and identify the visual data of his or her own language. Records and texts for various pairs of language can be made up and provided on a relatively inexpensive basis. Several record and text sheets can be made up for tourists with each sheet having questions and answers on a particular subject. A verbally handicapped person could use similar sheets but with text and and speech in the same language.

If a speech synthesizer used with the present invention has the capability to produce speech by phoneme identification, the invention can provide for multi-language capability. By one person's definition, the English language contains some 64 distinct phonemes. Using this same definition, only about 75 phonemes are required to produce speech for all of the major languages. In this way, if the speech synthesizer has in its memory the necessary control data for generating the 75 different phonemes, the invention can provide for translation between virtually any language any virtually any other language provided the display material has the corresponding visual data and coded data.

Numerous other advantages and features of the present invention will become readily apparent from the following detailed description of the invention and embodiments thereof, from the claims and from the accompanying drawing figures.

BRIEF DESCRIPTION OF THE DRAWINGS

In the accompanying drawing figures forming part of the specification, and in which like numerals are employed to designate like parts throughout the same.

DETAILED DESCRIPTION OF THE PREFERRED EMBODIMENTS

Figure 1:
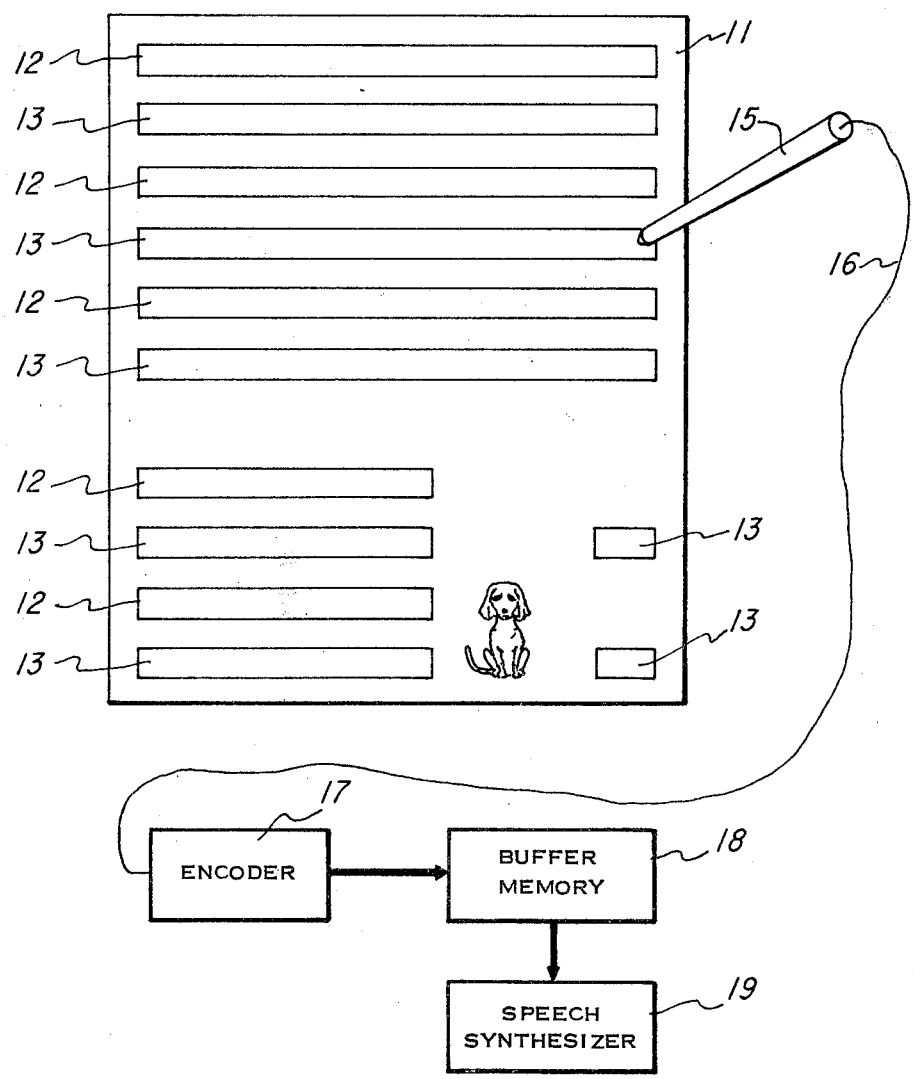
FIG. 1 is an overall block diagram of an embodiment utilizing the principles of the present invention.

Referring now to FIG. 1, display material 11 is a sheet or panel having alternate rows of visual identification language text 12 and speech code representations 13 imposed thereon. The language text 12 comprises visual data and identifies the speech code representations 13 which in turn comprises the coded data which to be inputted into the speech synthesizer. If the display material 11 consists of a sheet of paper, both the rows of text 12 and the representations 13 may be printed thereon. The display material or record 11 might also be a panel of material on which rows of text 12 and representations 13 could be imposed so that the encoded data is encoded on display material by forming raised bumps, and/or valleys on the display material. The coded data or representations 13 may be for the production of speech in the same language as that of the adjacent identifying row of text, or may be for the production of speech in a different language than the adjacent identifying row of text. Representations or coded data 13 could also be identified by and associated with visual data in the form of a picture 14 in which case the encoded data would provide input data to the speech synthesizer representative of a speech or sound effect associated with and identified by the picture or symbol. Other relationships between the identifying visual data 12 and the coded data 13 will become apparent to those skilled in the art.

A manually operable pick-up means is provided comprising a pen 15 shown with a chord 16 going to an encoder 17. Pen 15 is thus suitable for being hand-held so that it can be moved along any of the rows of representations 13 by the user. The user is thus able to pick out and identify any representation 13 by inspecting the rows of text or other visual data 12 on display material. By then moving the pen 15 along the coded data representations 13 associated with the visual data, the synthesizer will produce speech. Pen 15 will, of course, be of a type suitable for reading the representations 13. If, for example, representations 13 are optical bar codes, pen 15 could consist of a pencil-shaped case holding a light, a light sensitive element, and a lens similar to that disclosed in U.S. Pat. No. 3,869,599. The representations 13 could alternatively consist of mechanical deformations or notches such as raised bumps and valleys normal to the plane of the display material 11, or coplanar to the plane containing display material 11. In this case the length of each notch, in the general direction of the movement of the pickup means would determine the value of the encoded data bit. If the data was in such a form, the pen 15 may have a phonographic type pick-up mounted in its end or some simpler device for responding to bi-directional deflections.

Encoder 17 provides an output via buffer store 18 to a speech synthesizer 19 which corresponds to the information which was encoded on representations 13 after having been read by moving pen 15 over the coded data. The bar code reading output represents binary ones and zeros. However, the output signals are of different relative time duration and therefore must be converted to a more conventional binary representation to be useful in the control of most speech synthesizers. Mechanical deformations can be in two directions, each direction being generally transverse to the general direction of the pickup means movement, so that the output of pen 15 can indicate ones and zeros by the polarity of its output signal.

The rate of output of representations 13 from pen 15 will, of course, depend upon the rate at which the user moves the pen 15 over the representations 13. Since this rate may vary widely, encoder 17 could be clocked by the input signal so as to handle any rate of input. The representations from the pen 15 arrive serially while the speech synthesizer 19 may require control data in the form of bytes having bits in parallel form. Encoder 17 would then convert the serially received data to parallel form before passing it on to speech synthesizer 19. A buffer store 18 could store the received data, especially if it arrives at the speech synthesizer at a greater rate of speed than it could be used, or if the data arrives slower than the rate of normal speech, the start of the speech by speech synthesizer 19 can be delayed until enough data is on hand for it to produce speech at a normal rate for a reasonable time period.

Encoder 17 may consist of apparatus such as will later be described, or consist of a microcomputer apparatus, normally part of a speech synthesizer 19, which can be programmed to perform the necessary functions. This latter alternative can be especially advantageous when representations 13 are in the form of an optical bar code and when relatively complex functions must be performed to convert the output of the pen 15 to regular binary code. The buffer store 18 can then be part of a regular microcomputer memory and could then double as a storage device for other control inputs.

Speech synthesizer 19 could be of a type shown in U.S. Pat. No. 4,130,730 to Ostrowski, of which Federal Screw Works of Detroit, Mich. is assignee. This synthesizer is commonly referred to as a phoneme type synthesizer because it can produce speech in response to the proper input string of phoneme identifying code groups. Thus, with a modest expansion in a number of phonemes which can be handled, such a synthesizer can be adapted to produce speech in many different languages, since most phonemes are used in common by all languages. As referred to above, by one classification, the English language has some 64 such phonemes, and using the same system of classification, the speech of most all languages can be formed by using 75 such phonemes. A phoneme type synthesizer of the type just described is not limited as to the speech or language it can produce. It merely has to have a sufficient number of phonemes in its vocabulary.

While the speech synthesizer of the aforementioned patent has built-in timing for each phoneme, it would not be difficult to modify this type of speech synthesizer or other phoneme type synthesizers to produce phonemes with timing responding to a control input itself. Since the durations of phonemes vary widely depending upon their location and stress in speech, much more natural speech would result if the phoneme durations are also specified for the particular speech. The code representations 13 can obviously include such phoneme durational information. In the above referenced Ostrowski patent, two bits of each input control byte is used for inflection control. Code representations 13 can also provide information for inflection control and such other information as will improve the quality of the speech synthesizer output so that it will more closely resemble natural speech.

In addition to the phoneme type synthesizer just described, another type of speech synthesizer, using linear predictive coding derived from model speech could be used in the present invention. Such a synthesizer is shown in U.S. Pat. No. 4,189,779 to Brantingham, assigned to Texas Instruments. However, this type of speech synthesizer requires a much greater amount of control information for production of a given fixed amount of speech than with the phoneme type synthesizer. Thus, code representations 13 would necessarily have to contain a greater amount of information than is possible with visual bar codes in order to provide control information to a speech synthesizer at a sufficient rate so that it can generate speech at about 120 words a minute, which is the rate of normal speech. However, representations 13 provided in the form of phonograph type strips can provide the amount of information density required. The Texas Instruments synthesizer includes a vocabulary store of control information in a large electronic memory, which is used for the production of words and phrases. When being used with a linear predictive coding type speech synthesizer, the code representations 13 would supply only the code groups identifying these words or phrases by specifying their starting addresses in the vocabulary memory in order to call for their production in all or part of the speech message.

While the invention apparatus can produce novel and useful results using either of the two types of speech synthesizers just described, a fuller potential can be realized using a speech synthesizer designed to respond to phonemic type control information accompanied by auxiliary control information which specifies the speech desired in sufficient detail to result in natural and effective sounding speech. In this third type of speech synthesizer, such auxiliary information for producing natural sounding speech may include inflection and phoneme durational information, to give two examples. Code representations 13 will then have their information tailored for each of the speech passages in order to give the best speech effect. Thus, the invention can avoid the complex problems encountered when converting text to speech by using rules, while also providing a means for the production of natural sounding synthetic speech.

Figure 2:
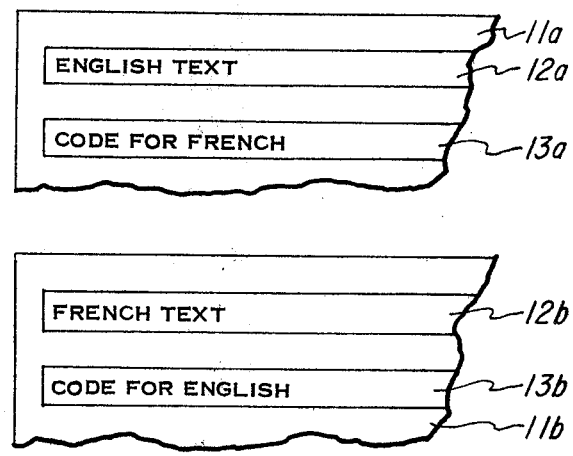
FIG. 2 is a close-up view of a fragmentary section of one form of display material which can be used in the embodiment of FIG. 1.

Referring now to FIG. 2, display material 11a is shown containing information for a language translator application. Using this type of display material, audible communication between two persons is facilitated even though the two persons do not share a common language. Using this arrangement, a computer is not necessary to translate from one language to another language, and essentially no training is required for a person to use the apparatus, as long as he can read visual data identifying his native language. One merely has to identify the text 12 of what he or she wants the speech synthetizer to say and then merely move the manually operable pick-up means over the coded data representation 13 associated therewith. For example, referring to FIG. 2, one section of a display material 11a has rows of English text 12a disposed above and associated with rows of coded data representations 13a which contain information for generating the equivalent speech in French. Conversely, the reverse can be done using French text 12b disposed over rows of code representations 13b to generate equivalent speech in English. One need merely identify source data 12a or 12b and then manually move pen 15 over the code representations 13a or 13b therefore to cause the synthesizer 19 to produce speech with an equivalent meaning in a different language.

The display material or sheets 11 can of course have many different expressions in each language. These expressions can be complete thoughts or sentences or can have blanks or partial sentences to provide greater versatility. One example is where one sheet of display material generates the partial sentence "where is the—" or "how much is the—," and a second sheet of display material would have lists of locations or lists of articles for a user to identify while having the coded data representations 13 below so that the user could fill in the blanks or form total sentences from partial sentences. Display material 11 could be placed in a book and be suitably indexed with tabs for easy location of the sheets of display material. Such an arrangement could be ideally employed by a foreign traveler. Communication can thus be effected between himself and natives by simply finding or identifying the visual data which he wants the speech synthesizer to produce in the native language and then by manually moving the pick-up means over the associated coded data. Buffer memory 18 could be controlled to input data for the complete sentence of message to speech synthetizer 19 only after all of the data is manually read in.

In other applications, such as an educational context, the visual identifying data or text and the synthesized speech represented by the coded data could of course be in the same language. This application could include using books for school age children. This child could, without knowing or understanding the visual identifying data, operate and move a pen 15 beneath a row of text to get an audible rendition thereof, and then associate the voice with the words or other visual data after he or she hears the audible signals. The child could then automatically start to associate the text and the sounds while being simultaneously entertained. Suitable various sound effects could be interspersed to hold the child's attention. The same application can be used to teach beginning readers new words as they became equipped to expand their vocabulary. In this case, a child can identify and read part of the text, but part of text could be as yet unlearned by him. Many other uses in education and entertainment will of course be found for the apparatus of the present invention.

Besides the above discussed uses in language translation and teaching people to read, another use for the invention is for teaching phonetics. Individual sounds, instead of whole words or sentences, can be easily produced in isolation with variations in duration, inflection and so on, in combination with appropriate visual symbols. Such a use can assist one in learning the proper pronunciation of phonemes in any language. By associating text and speech, the present invention can be useful in many other foreign language learning situations. A specific example is in a pronouncing dictionary which includes the code representations 13 in addition to the conventional language dictionary so that the invention apparatus can be used to provide an audibly correct pronunciation of words in the language. The code representations 13 could thus replace, or supplement, the conventional phonetic representations now used in dictionaries and thereby more easily assist a person in determining and learning the proper pronunciation.

Figure 3:
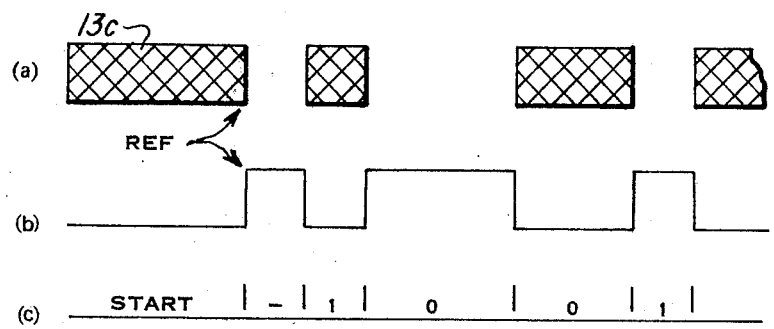
FIG. 3 is a representation of the wave form output from the manually operable pick-up means which could be obtained by passage or manual movement over the coded data shown in FIG. 2.

Various forms of code representations 13 will now be described. One type of optical bar code representation 13 is illustrated in FIG. 3, which also illustrates pick-up output signals representative of the coded data representations 13 and the binary numbers represented. FIG. 3a illustrates a bar code representation 13c consisting of alternate black and white bars having different widths. The large black section on the left could provide a starting location for pen 15, to provide space for acceleration of the pen 15 to an average velocity before it encounters the alternate black and white sections whose patterns represent the coded information. FIG. 3b shows the pick-up output signals outputs of pen 15 which would result from a constant velocity movement over the representation 13c. FIG. 3c shows the binary bit designations of ones and zeros corresponding to the bar of FIG. 3a.

The coded data representations 13c could also be in magnetic form, which could be either visible or invisible to the user. If it is in invisible form, it could be overlayed or superimposed on top of the visual identification data, so that one would manually move the manually operable pick-up means over the visual identifying data for the speech synthesizer to generate the desired speech.

In using a bar code arrangement, black and white bars alternate and have significance primarily in their widths, with the color change used only to indicate transitions. In one arrangement, a short black or white bar would thus signify a binary one and a long black or white bar would signify a binary zero. The widths for the zeros in this illustration are chosen to be three times the lengths for the ones. As will become apparent in the following discussion, this ratio of three to one would make it easy to discriminate with reasonable accuracy data representing ones and zeros even if the rate of speed at which the manually operable pick-up means is moved over the coded data varies fairly considerably. The first or leading white bar could provide for a binary one to thus provide a reference length for the decoding of the following bar. Encoder 17 would compare the length of each output with that of its immediately preceding output to determine whether it represents the same or different binary digit. In this way, since the encoder always compares the length of the presently read bar with its immediately preceding bar, the small variances in speed would not affect the accuracy at which pen 15 senses coded data.

Figure 4:
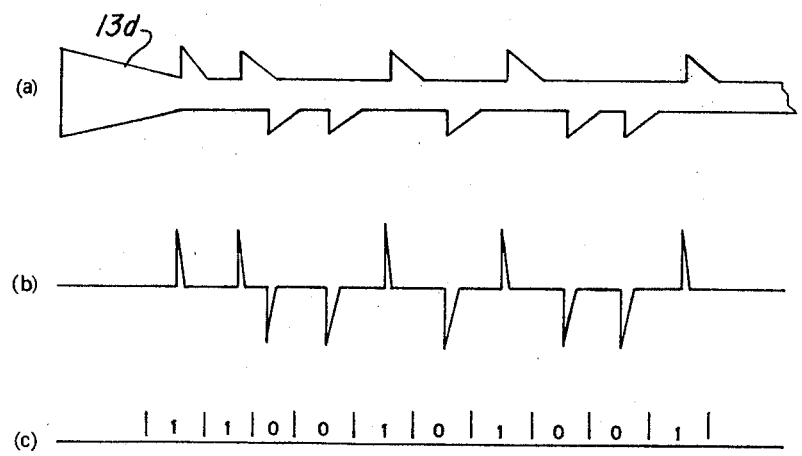
FIG. 4 shows a first alternative form for encoding coded data on display material also showing the pick-up wave form output corresponding thereto.

Referring now to FIG. 4, code representations 13c provide a way to store a much higher information density than is practical with the optical bar code of FIG. 3. Such higher information density may be useful or even necessary when using a speech synthesizer of the linear predictive coding variety described above. Representations 13d are shown in the form of a groove with a wide funnel opening at the left end to guide pen 15 into the narrower part which holds the coded data. The information as shown as left or right notches transverse to the direction of the groove which represents binary ones or zeros, respectively. It will be recognized that the right and left notches, instead of being generally in the plane of the display material, could be up and down bumps and notches generally normal to the plane of the display material. In either event, one transverse direction would represent binary ones and the other direction would represent binary zeros, and the undulations would be evenly spaced.

FIG. 4b shows positive pulse outputs from pin 15 or pick-up output signals representative of the coded data for bumps or notches in one direction and negative pulses for those in the opposite direction. FIG. 4c shows the binary code digits corresponding to the outputs.

When using coded data as shown in FIG. 4, encoder 17 need only discriminate as to the polarity of the pulse outputs to determine whether the bit is a binary one or zero. The pulse outputs can also use both the positive and negative pulses for clocking the binary digits during processing. Code representations 13d can be imposed on a record type display material made of the same type of material which is used for phonograph records, or could be strips of such material attached to a sheet between rows of the visual identifying data or printed text. Clocking could be derived from the input signals themselves, so that variations in manual improvement would not distort the intended meaning of the coded information. In this way, the manual movement of pen 15 with a phonographic or other type of undulation-sensitive pick-up will be satisfactory for playback.

Figure 5:
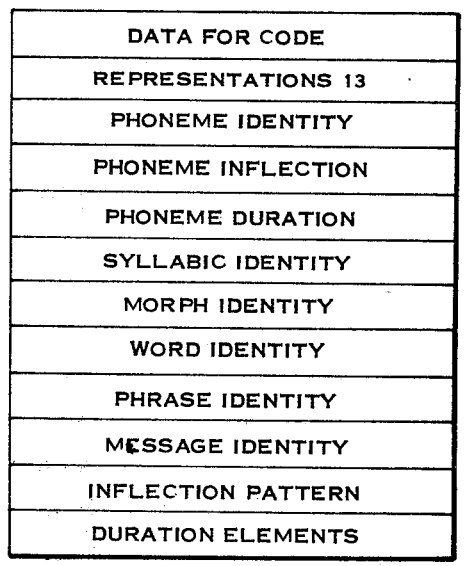
FIG. 5 is a listing of the various types of coded control data which might be encoded on a display material.

FIG. 5 lists the type of information which may be conveyed by code representation 13, if a speech synthesizer is operable and controlled by such information. The first type of information on the list is phoneme identity information which would be used by a phoneme type synthesizer to produce any of the phonemes within its vocabulary. The second type of information listed is phoneme inflection information which would specify the pitch and amplitude patterns with which the phoneme is produced. As discussed above, the speech synthesizer disclosed in U.S. Pat. No. 4,130,730 to Ostrowski is adapted to respond to phoneme identity and phoneme inflection inputs.

The next type of information on the list is phoneme duration information which is of importance for producing a higher degree of natural speech. Synthesizers may have such parameters built in, but any fixed set of parameter values will result in a more unnatural speech. The synthesizer 19 used in the system of the present invention can have a good vocabulary of phonemes for the languages to be produced, but control of pitch and inflection should be left to code representations 13 in order that speech will be formed as naturally and effectively as possible in all instances.

Other type synthesizers may include fixed parameter values for syllables, morphs, words, phrases, and complete messages. When such a synthesizer is included in the invention, code representations 13 can produce codes suitably identifying those of these larger speech units as desired. As in the Texas Instruments synthesizer, which uses linear predictive coding, these identity codes may consist of the starting addresses for control information of these elements. As with phonemes, inflection patterns and durations of these larger elements vary widely with the speeches in which they may be used. Code representations 13 may include such additional information as will assist the production of them in patterns best fitting the intended speech.

Figure 6:
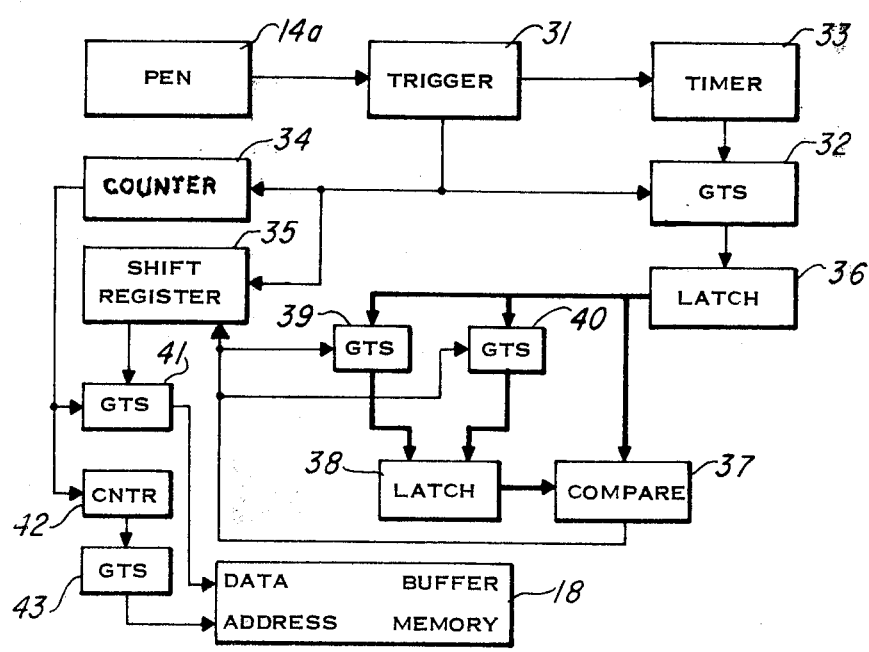
FIG. 6 shows the embodiment of an encoder which can be used in the apparatus employing the principles of the invention.

FIG. 6 shows an embodiment of an encoder which can be used when the code representations 13 have patterns as shown in FIG. 3. The output of pen 15 is applied to a trigger circuit 31 which in turn produces an output pulse each time the output of pen 15 changes state. One pulse output of trigger 31 operates gates 32 before a second pulse output resets timer 33. The pulse output from trigger 31 is also applied to set counter 34 and shift register 35. Operation of gates 32 by each pulse output passes the count stored in timer 33 to latch 36. Compare 37 receives the outputs of latch 36 and the output of latch 38, which holds value corresponding to the previous output from timer 33 and the value registered for the previous count will be later explained.

Compare unit 37 produces a positive output when the number in latch 38 is larger than that in latch 36, and produces a negative output when the number in latch 38 is less than or equal to the number in latch 36. The positive outputs indicate a binary one bit and the negative outputs a binary zero bit. The output of compare 37 is then inputted to the data input of shift register 35, so that it gets read in as the value of the next bit. The output of compare 37 also goes to opposite plurality inputs of gates 39 and 40. Gates 39 will operate when the output is positive and gates 40 will operate when the output is negative. Gates 39 and 40 both receive the outputs of latch 36 as their controlled inputs. Gates 39 present these controlled inputs to latch 38 in a shift left position and gates 40 present these controlled inputs to latch 38 in a shift right position. In this way, the value of the byte so representing the data is either multiplied by two or multiplied by one-half. (Alternatively, one may provide for subtracting or adding a bit to these input bits). The last input thus gets stored in latch 38 at double its actual value if it was indicated to represent a binary one, and at half its actual value if it was determined to represent a binary zero.

Since the binary zero intervals would be preferably three times the width of the binary one intervals if the pen 15 moves at a uniform velocity, a number stored in latch 38 will always be greater than that in latch 36 when the input represents a binary one and less than that in latch 36 when the input represents a binary zero. The rate of movement of pen 15 which reads the representations 13 can thus vary by fifty percent without causing an error in reading the encoded bit values. Pen 15 can thus move at any speed and still produce periods within the range of timer 33 without causing an error. (The above sequence can be checked by taking the binary bit one interval as proportional to one and the binary zero bit as proportional to three, as is the case with the bar code of FIG. 3. The value in latch 38 will then be proportional to 1.5 if the last bit was a zero bit and will be proportional to two if the last was a binary one bit. The one and three values can thus vary up to 50 percent without causing an error).

Counter 34 produces an output to operate gates 41 and step counter 42 after each byte of information has been shifted into shift register 35. The encoded binary bits shifted into shift register 35 are then passed through gates 41 to the data input of buffer memory 18. The output of counter 42 registers the number of the byte and its output goes to the address input of buffer memory 18. Counter 42 includes output gates 43 which operate for a short interval when it is stepped.

In this way, the conversion means for producing a binary coded output signal representative of and in response to the pickup output signal has comparison means for comparing a segment of pickup output signal data to a reference signal. The conversion means produces a binary coded output signal having one binary value in response to a characteristic of the segment of pick up output signal being greater than a characteristic of the reference signal, and produces a binary coded output signal having a binary value complementary to said one binary value in response to the characteristic of the segment of pick up output signal being equal to or less than the characteristic of the reference signal. The reference signal is modified depending upon the value of the previously produced binary coded output signal. In this way, means are provided for accurately producing binary coded output signals even though the rate of movement of the pen 15 may vary considerably.

Figure 7:
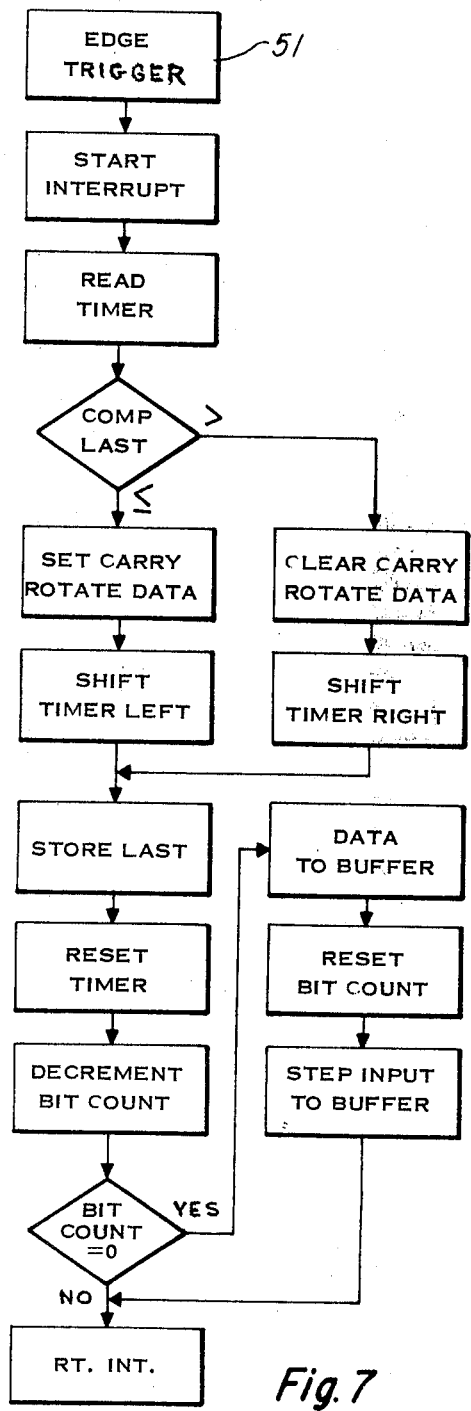
FIG. 7 shows the flow chart of a computer program to encode information from a manually operable pick-up means when the pick-up output is applied to the interrupt input of the computer.

FIG. 7 shows another means for implementing encoder 17 for bar code reading, comprising a microcomputer interrupt program, which is substantially the same in function as that of the apparatus of FIG. 6. The output pen 15 is applied to an edge trigger circuit which produces an output pulse to the interrupt input of the microcomputer each time the output of pen 15 changes state. Each change of state of the output of pen 15 thus initiates an interrupt routine. After saving the return address, status and registers, the interrupt routine next reads the timer and compares it with the previous timer data stored in Last. This data will have been shifted right if the Last bit was a binary zero and will have been shifted left if the Last bit was a binary one, so that the result of the compare will be the same as that of compare 37 of FIG. 6. If the compare 37 finds the timer input smaller, it takes the branch to set the carry and will rotate a binary one into the data. It next shifts the timer value left, effectively doubling its size for the next compare, and stores it in Last. However, if the compare finds the timer value to be larger, it takes the branch to clear the carry and rotate the resulting zero bit into the data. It then shifts the timer value right and stores it in Last. It will be recognized that this section results in the same number being stored in Last as was stored in latch 38 of FIG. 6 and the same bit being stored in data as into shift register 35 of FIG. 6. After storing Last, the interrupt routine next resets the timer and decrements the bit count. If the bit count has reached zero, the data is transferred to the buffer store. The bit count is then reset and the index to buffer is stepped up to the next position. The last step in this flow chart is a return from interrupt, and the microcomputer resumes whatever processing it was doing when interrupted.

If the speech synthesizer 19 contains such a microcomputer, as is quite likely to be the case, it would be quite economical to have it perform the encoding function described in FIG. 7. The buffer 18 would then simply be part of the microcomputer memory. The only equipment required in addition to speech synthesizer 19 would be pen 15, edge trigger circuit 51, and the display material 11 to complete the system of the present invention.

Figure 8:
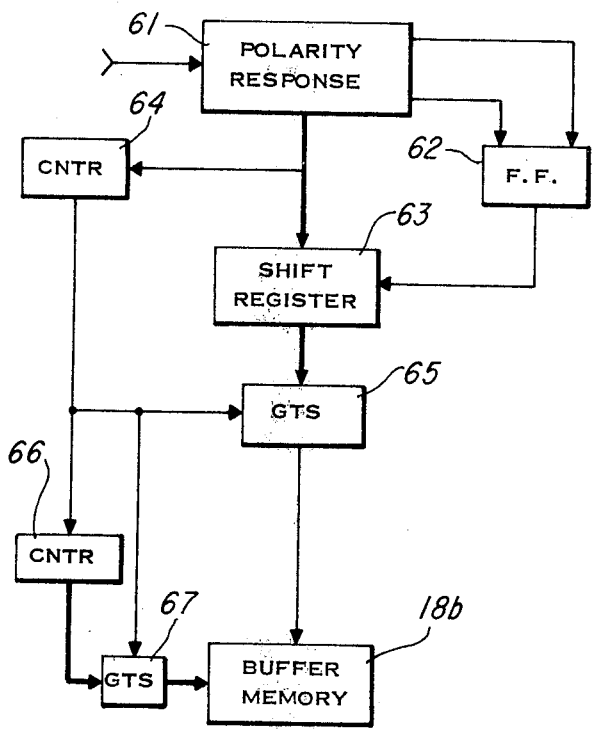
FIG. 8 shows an embodiment for an encoder when the manually operable pick-up means provides opposite polarity outputs for binary coded input data.

Referring now to FIG. 8, another embodiment for encoder 17 will now be described. This embodiment could be used ideally when the coded input data is in the form shown in FIG. 4. In that case, pen 15 provides opposite polarity outputs for binary ones and zeros. Polarity response circuit 61 produces set and reset inputs to flip-flop 62 of one and zero polarity pulses, respectively from pen 15. The state of flip-flop 52 will thus always represent the value of the last bit. The polarity of response circuit 61 will produce a pulse out for each pulse in regardless of its polarity. This output is then applied to step shift register 63 and counter 64. Shift register 63 will receive a data input from flip-flop 62 which is thus clocked along as each bit is received. Counter 64 registers the number of bits and produces an output to operate gate 65, step counter 66, and to operate gates 67. Gates 65 wll pass the contents of shift register 63 to the data input of buffer store 18b. Gate 67 will pass the number in counter 66 to the address input of buffer store 18b. As can be appreciated, this arrangement can be considered to be somewhat simpler than that of FIG. 6.

The speed of the voice output from speech synthesizer 19 could be regulated in at least two ways. One is by making it dependent upon the speed of the movement of pen 15. This would give a direct correlation between manual movement of pen 15 and the speech output. Alternatively, the speed of the speech from the speech synthesizer could be fixed and independent of the movement of the pen 15, or be adjustable by providing a variable potentiometer. Other means to vary the speed will thus become apparent to those skilled in the art.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

I claim:

1. A speaking apparatus adapted to cooperate with a display material said display material having affixed thereto visual data and associated digitally coded speech data, said apparatus comprising;

pickup means for sensing said digitally coded speech data, and for producing digital output signals identifying speech sounds;

a speech synthesizer including means for storing sets of compressed data, each such set corresponding to one of said speech sounds, and electronic circuit means responsive to any of said sets of compressed data to audibly produce the corresponding speech sound; and means responsive to said digital output signals to select sets of compressed data for controlling the operation of said electronic circuit means, the selected sets of compressed data corresponding to the speech sounds identified by said digital output signals.

2. The speaking apparatus of claim 1 wherein said speech synthesizer comprises a linear predictive coding type synthesizer.

3. The speaking apparatus of claim 1 wherein said speech synthesizer comprises a formant type synthesizer.

4. The speaking apparatus of claim 1 wherein said digitally coded data identifies words or phrases to be spoken by said speech synthesizer.

5. The speaking apparatus of claim 1 wherein said digitally coded data identifies parts of speech of the type including phonemes which parts are assembled to produce words spoken by said synthesizer.

6. The speaking apparatus of claim 5 wherein said digitally coded data further identifies the inflection to be assigned to said parts of speech.

7. The speaking apparatus of claim 5 wherein said digitally coded data further identifies the duration to be assigned to said parts of speech.

8. A manually controllable speaking apparatus adapted to cooperate with a display material said display material having affixed thereto visual data and associated digitally coded speech data, said apparatus comprising;

manually controllable pickup means for sensing said digitally coded speech data in response to manual movement over said digitally coded data, and for producing digital output signals identifying speech sounds;

a speech synthesizer including means for storing sets of compressed data, each such set corresponding to one of said speech sounds, and electronic circuit means responsive to any of said sets of compressed data to audibly produce the corresponding speech sound; and means responsive to said digital output signals to select sets of compressed data for controlling the operation of said electronic circuit means, the selected sets of compressed data corresponding to the speech sounds identified by said digital output signals.

9. The speaking apparatus of claim 8 wherein said digital output signals constitute a sequence of ones and zeroes and wherein said apparatus includes adaptive means for detection of said ones and zeroes.

10. The speaking apparatus of claim 9 wherein said adaptive means utilizes a threshold for distinguishing between ones and zeroes, which threshold varies as a function of previously detected data.

11. The speaking apparatus of claim 1 or 10 further comprising means to convert siad digital output signals from serial to parallel form in preparation for coupling the signal in parallel form to said speech synthesizer.

12. The speaking apparatus of claim 1 or 10 further comprising means for storing a preselected quantity of said digital output signal prior to coupling said digital output signal for selection of sets of compressed data.

13. The speaking apparatus of claim 12 wherein said preselected quantity comprises a plurality of bytes.

14. The speaking apparatus of claim 1, 2, 3, 4, 5, 6, 7, 8, 9 or 10 wherein said speech synthesizer produces words corresponding to said visual data.

15. A speaking apparatus comprising:
display material said display material having affixed thereto visual data and associated digitally coded speech data;
pickup means for sensing said digitally coded speech data, and for producing digital output signals identifying speech sounds;
a speech synthesizer including means for storing sets of compressed data, each such set corresponding to one of said speech sounds, and electronic circuit means responsive to any of said sets of compressed data to audibly produce the corresponding speech sound; and
means responsive to said digital output signals to select sets of compressed data for controlling the operation of said electronic circuit means, the selected sets of compressed data corresponding to the speech sounds identified by said digital output signals.

16. The speaking apparatus of claim 15 wherein storage means are provided for storing the data of said digital output signals in response to receipt thereof from said pickup means prior to acquisition of said digital output signals by said means to select.

17. The speaking apparatus of claim 15 wherein said digitally coded data is in the form of an optical bar code comprising alternating regions of at least two different optical characteristics.

18. The speaking apparatus of claim 15 wherein said coded data is in magnetic form.

19. The speaking apparatus of claim 15 wherein said means for producing has comparison means for comparing a segment of sensed data to a reference signal segment, and for producing a digital output signal having one binary value in response to a characteristic of the segment of sensed data being greater than the characteristic of the reference signal segment, and for producing a digital output signal having a binary value complementary to said one binary value in response to the characteristic of the segment of sensed signal being equal to or less than the characteristic of the reference signal segment.

20. The speaking apparatus of claim 19 wherein reference signal modification means are provided for modifying the characteristic of the reference signal segment by increasing the value of the characteristic of the reference signal segment in response to the value of last provided digital output signal having one binary value and for decreasing the characteristic of the reference signal segment in response to the value of the last provided digital output signal having a binary value complementary to said one binary value.

21. The speaking apparatus of claim 15 wherein said pickup means senses said coded data in response to manual movement thereover.

22. The speaking apparatus of claim 15 wherein said digitally coded data identifies speech sounds to be produced sequentially and indicates the relative durations and pitch inflection with which they are to be produced.

23. The speaking apparatus of claim 22 wherein said speech sounds include phonemes which can be produced by said speech synthesizer.

24. The speaking apparatus of claim 22 wherein said speech sounds include words which can be produced by said speech synthesizer.

25. The speaking apparatus of claim 15 wherein said speech synthesizer includes a microprocessor apparatus performing at least some of the speech signal production functions and wherein said microprocessor apparatus further includes a buffer memory for holding a plurality of bytes of digital output signal; means for loading the data of the digital output signal from said pickup means into successive byte locations in said buffer memory; and means for reading successive bytes of data from said buffer memory to control the speech output of said speech synthesizer.

26. The speaking apparatus of claim 25 wherein said digitally coded data represents binary values by the relative spacing of successive indications; wherein said pickup means produces trigger outputs responsive to passage over said indications; and wherein said microprocessor apparatus has an interrupt input responsive to the trigger outputs of said pickup means; means for timing the intervals between successive trigger outputs from said pickup means; means for determining the binary values represented by comparing the successive intervals measured by said timing means; and means for supplying the binary values found by said determining means to said loading means.

27. Manually operable speaking apparatus comprising: display material having alternate lines of text and digitally coded data printed thereon, said coded data representing the control information for production of speech corresponding to said text;
a manually operable pickup means for sensing said coded data in response to manual movement along the lines of said coded data, and for producing a digital output signal identifying speech sounds;
storing means receiving said digital output signals from said pickup means and holding the data of said digital output signal;

a speech synthesizer including audio output means for producing speech; and output means for providing the data of said digital output signal held by said storing means to control said speech synthesizer for production of the speech called for by said coded data.

28. The speaking apparatus of claim 27 wherein said digitally coded data identifies the speech sounds to be produced sequentially by said speech synthesizer and indicates the relative durations and pitch inflection with which said speech sounds are to be produced.

29. The speaking apparatus of claim 28 wherein said speech sounds include phonemes and said speech synthesizer has stored information for the production of said phonemes.

30. The speaking apparatus of claim 27 wherein said speech sounds include words and said speech synthesizer has stored information for the production of said words.

31. The speaking apparatus of claim 27 wherein said digitally coded data is in the form of a printed bar code comprising alternating regions of at least two different reflective characteristics.

32. The speaking apparatus of claim 31 wherein said coded data is in binary form with different lengths of said regions representing different binary values; wherein said pickup means has a different state when over regions of different reflective characteristics; and wherein said pickup means determines the binary values to be represented by said digitally coded output signal from the relative durations of successive states of said pickup means.

33. The speaking apparatus of claim 32 wherein said pickup means includes means for timing the interval of each state of said pickup means; means for modifying the value found for the preceding interval by said timing means responsive to the preceding binary value; and means for comparing the output of said timing means with the output of said modifying means to determine the binary value represented.

34. The speaking apparatus of claim 33 wherein the values found by said timing means are in binary form; and wherein said modifying means includes means for shifting the value found by said timing means for the preceding interval in a direction determined by the preceding binary value.

35. The speaking apparatus of claim 27 wherein said digital output signals from said pickup means present binary values serially; wherein said storing means includes a register receiving the serially presented binary values of said digital output signal from said pickup means; a buffer memory for holding a plurality of binary coded data bytes; and means for transferring the contents of said register to said buffer memory each time said register holds a new byte of data from said pickup means; and wherein said output means reads out binary coded data bytes from said buffer memory to said speech synthesizer.

36. Manually operable speaking apparatus comprising:

a speech synthesizer to produce speech corresponding to text;

display material having alternate lines of text and digitally coded speech data printed thereon, said coded speech data representing the control information for production of speech corresponding to text by said speech synthesizer;

a manually operable pickup means for sensing said coded speech data in response to manual movement along the lines of said coded data, and for producing a pickup output signal representative of said coded data; and a microprocessor apparatus providing;

conversion means for producing a binary coded output signal representative of and in response to said pickup output signal, storing means receiving said binary coded output signal from said conversion means and holding the data of said binary coded output signal; and output means for providing the data of said binary coded output signal held by said storing means to said speech synthesizer for control of speech production.

* * * * *